United States Patent
Kline et al.

(10) Patent No.: US 10,768,630 B2
(45) Date of Patent: Sep. 8, 2020

(54) HUMAN IMPERCEPTIBLE SIGNALS

(71) Applicant: INTERNATIONAL BUSINESS MACHINES CORPORATION, Armonk, NY (US)

(72) Inventors: Eric V. Kline, Rochester, MN (US); Pitipong J. Lin, Brookline, MA (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 363 days.

(21) Appl. No.: 15/428,158

(22) Filed: Feb. 9, 2017

(65) Prior Publication Data
US 2018/0224864 A1 Aug. 9, 2018

(51) Int. Cl.
*G05D 1/02* (2020.01)
*G01C 21/34* (2006.01)

(52) U.S. Cl.
CPC ......... *G05D 1/0234* (2013.01); *G05D 1/0255* (2013.01); *G05D 1/0259* (2013.01); *G01C 21/34* (2013.01); *G05D 2201/0213* (2013.01)

(58) Field of Classification Search
CPC .. G05D 1/0234; G05D 1/0255; G05D 1/0259; G05D 2201/0213; G01C 21/34
USPC ......................................................... 701/23
See application file for complete search history.

(56) References Cited

U.S. PATENT DOCUMENTS

| | | | | |
|---|---|---|---|---|
| 4,832,427 A | * | 5/1989 | Nanba | G02B 27/0018 359/15 |
| 6,729,541 B1 | * | 5/2004 | Kurokawa | G11B 7/24044 235/454 |
| 9,914,463 B2 | * | 3/2018 | Otsuka | B60W 50/082 |
| 9,990,849 B2 | * | 6/2018 | Mielenz | G08G 1/141 |
| 2008/0129544 A1 | | 6/2008 | Augst | |
| 2011/0248960 A1 | * | 10/2011 | Gruhlke | G06F 3/0416 345/175 |
| 2012/0098819 A1 | * | 4/2012 | Furuya | G02B 5/32 345/212 |
| 2012/0135535 A1 | * | 5/2012 | Grier | G03H 1/0005 436/164 |
| 2012/0173080 A1 | * | 7/2012 | Cluff | B62D 15/028 701/42 |

(Continued)

FOREIGN PATENT DOCUMENTS

| | | |
|---|---|---|
| CN | 105427591 A | 3/2016 |
| CN | 105444741 A | 3/2016 |

(Continued)

*Primary Examiner* — Tuan C To
(74) *Attorney, Agent, or Firm* — Cantor Colburn LLP; Tihon Poltavets

(57) ABSTRACT

Systems, methods, and computer-readable media are disclosed for initiating a response action based at least in part on a human imperceptible signal. An emitting device may emit a human imperceptible signal. The signal may be received by a receiving device. The receiving device may analyze the signal to obtain digital information contained therein. The receiving device may then initiate a response action based at least in part on the digital information. Further, the emitting device may dynamically modify the human imperceptible signal based on a change to a characteristic in an environment into which the human imperceptible signal is emitted.

14 Claims, 4 Drawing Sheets

(56) References Cited

U.S. PATENT DOCUMENTS

| | | | |
|---|---|---|---|
| 2013/0100241 A1* | 4/2013 | Sato | G02B 21/06 |
| | | | 348/40 |
| 2014/0282008 A1* | 9/2014 | Verard | G03H 1/00 |
| | | | 715/728 |
| 2015/0146271 A1* | 5/2015 | Lee | G03H 1/0808 |
| | | | 359/23 |
| 2015/0177687 A1* | 6/2015 | Lee | G03H 1/0476 |
| 2015/0346340 A1* | 12/2015 | Yaacobi | G01S 7/4817 |
| | | | 356/5.11 |
| 2016/0161755 A1* | 6/2016 | Yonekubo | G02B 27/4227 |
| | | | 345/8 |
| 2016/0217558 A1 | 7/2016 | Lee | |
| 2016/0299228 A1* | 10/2016 | Maleki | H01S 3/00 |
| 2017/0036673 A1* | 2/2017 | Lee | A61B 3/112 |
| 2017/0120803 A1* | 5/2017 | Kentley | B60Q 1/525 |
| 2017/0120804 A1* | 5/2017 | Kentley | G05D 1/0088 |
| 2017/0175431 A1* | 6/2017 | Bradley | G06Q 10/08 |
| 2017/0227470 A1* | 8/2017 | Cesarano | G05D 1/0214 |
| 2017/0334339 A1* | 11/2017 | Kurashige | F21S 41/00 |
| 2017/0363437 A1* | 12/2017 | Baracco | G01C 21/367 |
| 2018/0072313 A1* | 3/2018 | Stenneth | B60W 30/09 |
| 2018/0081322 A1* | 3/2018 | Robbins | G03H 1/0248 |
| 2018/0143639 A1* | 5/2018 | Singhal | G01S 13/862 |
| 2018/0204399 A1* | 7/2018 | Newman | H04L 9/3215 |
| 2018/0364643 A1* | 12/2018 | Kroll | G03H 1/26 |
| 2019/0025406 A1* | 1/2019 | Krelboim | H01S 5/06216 |

FOREIGN PATENT DOCUMENTS

| | | | | |
|---|---|---|---|---|
| JP | 2007114403 A | * | 5/2007 | G03H 1/0005 |
| JP | 2016166814 A | * | 9/2016 | G01S 17/89 |
| WO | WO-2004088645 A1 | * | 10/2004 | G11B 7/1353 |

* cited by examiner

HUMAN IMPERCEPTIBLE SIGNALS

BACKGROUND

Machines and systems can be configured to emit and receive signals to enable machine-to-machine communication. There are a number of drawbacks associated with conventional machine-to-machine signal communication, technical solutions to which are described herein.

SUMMARY

In one or more example embodiments of the disclosure, a method for utilizing a human imperceptible signal is disclosed. The method includes detecting the human imperceptible signal, analyzing the human imperceptible signal to obtain digital information contained in the human imperceptible signal, and initiating a response action based at least in part on the digital information.

In one or more other example embodiments of the disclosure, system for utilizing a human imperceptible signal is disclosed. The system includes at least one memory storing computer-executable instructions and at least one processor configured to access the at least one memory and execute the computer-executable instructions to perform a set of operations. The operations include detecting the human imperceptible signal, analyzing the human imperceptible signal to obtain digital information contained in the human imperceptible signal, and initiating a response action based at least in part on the digital information.

In one or more other example embodiments of the disclosure, a computer program product for utilizing a human imperceptible signal is disclosed that includes a non-transitory storage medium readable by a processing circuit, the storage medium storing instructions executable by the processing circuit to cause a method to be performed. The method includes detecting the human imperceptible signal, analyzing the human imperceptible signal to obtain digital information contained in the human imperceptible signal, and initiating a response action based at least in part on the digital information.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for initiating a response action based at least in part on a human imperceptible signal. While the signal may be imperceptible to humans, a machine may be capable of detecting and analyzing it. In one or more example embodiments of the disclosure, an emitting device may emit a human imperceptible signal. The signal may be received by a receiving device. The receiving device may analyze the signal to obtain digital information contained therein. The digital information may include, without limitation, instructions, route guidance, directions, data, information, communications, or the like. The receiving device may then initiate a response action based at least in part on the digital information. The response action may, without limitation, correspond to a navigational objective, a safety objective, or the like. Further, the emitting device may dynamically modify the human imperceptible signal based on a change to a characteristic in an environment into which the human imperceptible signal is emitted.

Figure 1:
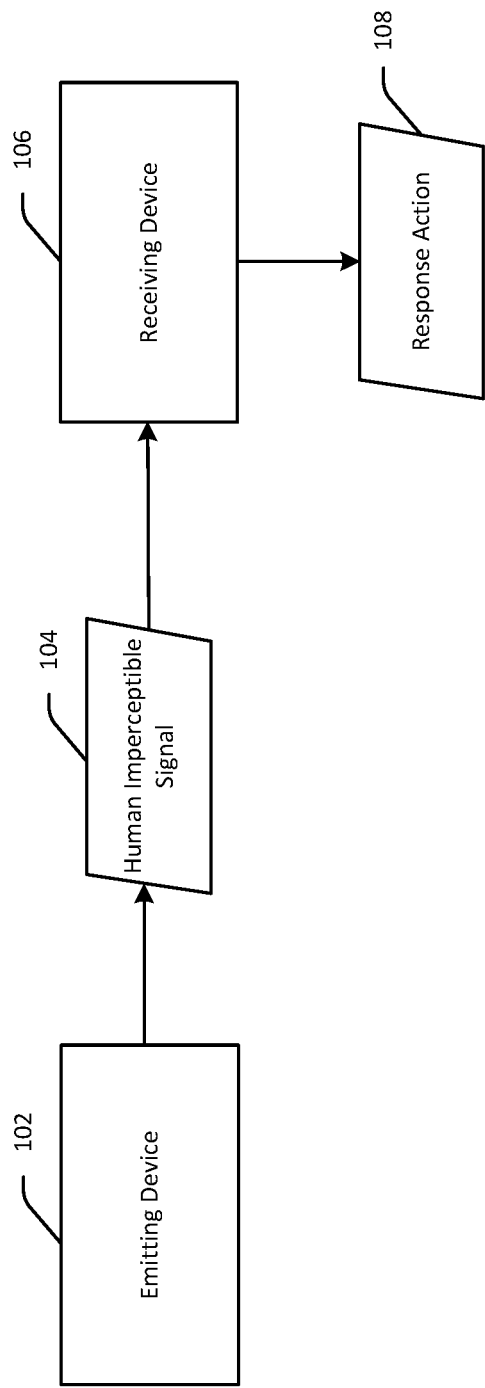
FIG. 1 is a schematic block diagram depicting the emission and reception of a human imperceptible signal and the initiation of a response action based thereon in accordance with one or more example embodiments of the disclosure.
Figure 2:
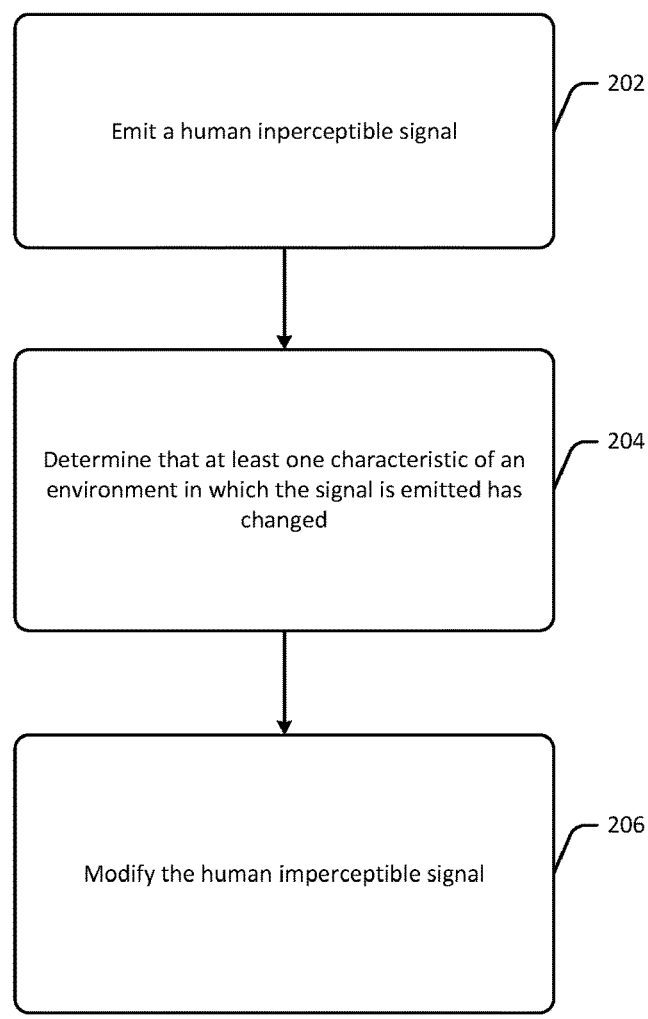
FIG. 2 is a process flow diagram of an illustrative method for dynamically modifying a human imperceptible signal based on changed characteristics of an environment into which the signal is emitted in accordance with one or more example embodiments of the disclosure.
Figure 3:
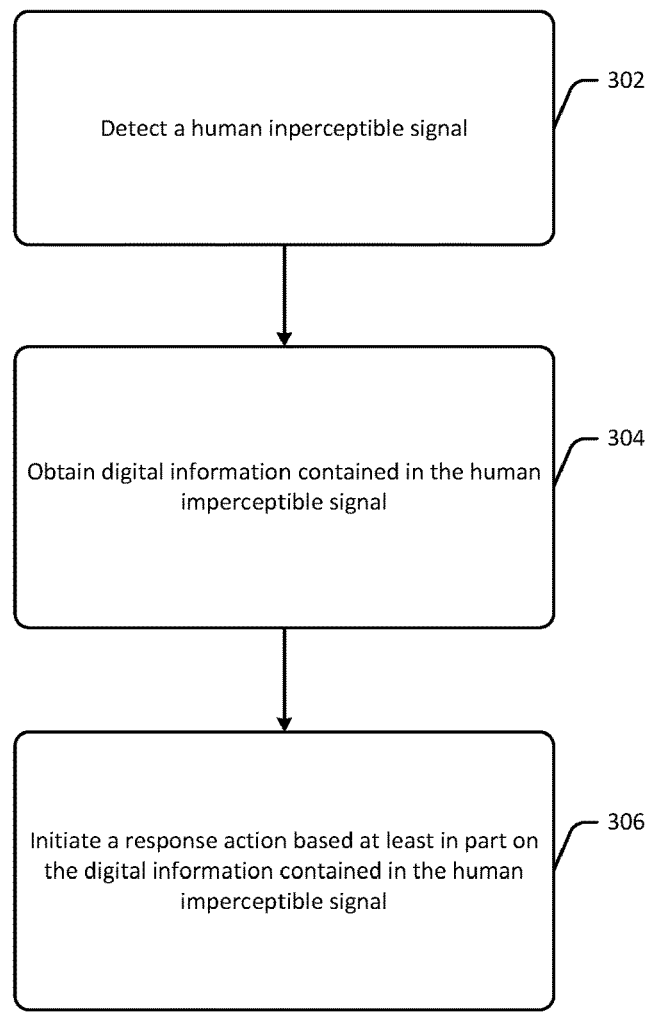
FIG. 3 is a process flow diagram of an illustrative method for detecting a human imperceptible signal and performing a response action based thereon in accordance with one or more example embodiments of the disclosure.

FIG. 1 is a schematic block diagram depicting the emission and reception of a human imperceptible signal and the initiation of a response action based thereon in accordance with one or more example embodiments of the disclosure. FIG. 2 is a process flow diagram of an illustrative method 200 for dynamic modifying a human imperceptible signal based on changed characteristics of an environment into which the signal is emitted in accordance with one or more example embodiments of the disclosure. FIG. 3 is a process flow diagram of an illustrative method 300 for detecting a human imperceptible signal and performing a response action based thereon in accordance with one or more example embodiments of the disclosure. FIGS. 2 and 3 will be described hereinafter in conjunction with FIG. 1.

Each operation of either of the methods 200 or 300 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIG. 2 in conjunction with FIG. 1, at block 202, computer-executable instructions of one or more human imperceptible signal generation modules residing, for example, on an emitting device 102 may be executed to cause a human imperceptible signal 104 to be emitted. The emitting device 102 may be a mobile device, a stationary device or group of stationary devices located in an environment (e.g., a parking garage), a device that is coupled to a mobile object such as a vehicle (e.g., autonomous vehicle), or the like.

The human imperceptible signal 104 may be a hologram or other light or electromagnetic spectrum (EM) signal. The human imperceptible signal 104 may be an invisible signal, in inaudible signal, or a signal that is otherwise imperceptible to the human senses. For example, the human imperceptible signal 104 may be a hologram or other EM signal having a wavelength that is outside of the passband of visible light of about 400 nanometers (nm) to about 800 nm. If the human imperceptible signal 104 is an auditory, ultrasonic, or haptic signal, the signal 104 may be imperceptible if its wavelength is outside of the passband of about 20 Hertz (Hz) to 20K Hz.

At block 204, computer-executable instructions of one or more dynamic signal adjustment modules residing, for example, on the emitting device 102 may be executed to determine that at least one characteristic of an environment into which the signal 104 is emitted has changed. Then, at block 206, computer-executable instructions of the dynamic signal adjustment module(s) may be executed to modify the human imperceptible signal based at least in part on the determined change in the at least one environmental characteristic.

As will be described in more detail later in this disclosure, the human imperceptible signal 104 may be, in example embodiments, a hologram representing at least a portion of a boundary of a parking location. The signal 104 may be, for example, a hologram that is machine-detectable as a machine-vision wall but which is imperceptible to a human. In such an example embodiment, the environmental characteristic determined at block 202 may be a distance between the boundary of the parking location and an adjacent vehicle. The detected change may then be a change in distance between an adjacent vehicle and the parking location.

For example, a first vehicle parked adjacent to the parking location may be a distance d1 from the boundary of the parking location. This first vehicle may exit the parking location, and a second vehicle may park adjacent to the parking location at a distance d2 from the boundary of the parking location. This change in the distance to the adjacent vehicle may be determined at block 202, and the positioning of the human imperceptible hologram wall may be modified to reflect this change.

Referring now to FIG. 3 in conjunction with FIG. 1, at block 302, a receiving device 106 may detect/receive the human imperceptible signal 104. As previously described, the signal 104 may be a hologram or other EM signal that is invisible, inaudible, or otherwise undetectable by a human. As another example, the signal 104 may be a haptic signal with a frequency outside of the range detectable by humans. The signal 104 may be static or dynamic.

At block 304, computer-executable instructions of one or more human imperceptible signal analysis modules residing, for example, on the receiving device 106 or another device coupled to the receiving device 106 may be executed to analyze the signal 104 and obtain digital information contained therein. The digital information may be, for example, a data signal containing instructions (e.g., route guidance information) for enabling or assisting with one or more operations of the receiving device 106 or another device coupled to the receiving device 106. In other example embodiments, analyzing the signal 104 to obtain digital information may include interpreting the signal 104 as a rendering of a physical barrier or object. In such example embodiments, the human imperceptible signal 104 may be a hologram or other rendering of a parking location boundary, a lane divider, a barrier, or the like. Further, in certain example embodiments, the human imperceptible signal 104 may be a route path that an autonomous vehicle may utilize to navigate from a starting location to a destination location.

At block 306, computer-executable instructions of one or more response action determination modules residing, for example, on the receiving device 106 or another device coupled to the receiving device 106 may be executed to initiate a response action 108 based at least in part on the digital information contained in the human imperceptible signal. The response action may relate to any of a variety of types of objectives such as, for example, navigational objectives, safety objectives, or the like.

In certain example embodiments, the human imperceptible signal 104 and/or digital information contained therein may be utilized by an autonomous vehicle parking assistance protocol. For example, one or more emitting devices 102 may be provided at a parking venue. The emitting device(s) 102 may emit human imperceptible signals 104 that may be rendered as human invisible walls on either side of a parking space. Such holographic or other light-based machine vision walls may provide better parking accuracy for autonomous vehicle parking protocols than ground markings because ground markings can become covered with debris, oil, or the like and become obscured.

Further, in other example embodiments, holographic or other light-based machine walls representing a boundary of a parking space may be modified based on changes to an environment. For example, the machine walls may be repositioned based on the skew associated with a vehicle parked adjacent to the parking space. Further, as the distance between an adjacent vehicle and the boundary of the parking space changes, the machine walls may be repositioned to indicate more or less tolerance in parking.

In addition, in certain example embodiments, the receiving device 106 may be coupled to a human-driven or autonomous vehicle and may detect the human imperceptible signal 104 (e.g., an invisible hologram) upon entry into a parking garage. The invisible hologram may move from the starting location to a destination location (e.g., a first available parking spot) along a predetermined path. In this manner, the invisible hologram may lead the vehicle along the predetermined path. In certain example embodiments, the emitting device 102 may also be coupled to the vehicle, while in other example embodiments, the emitting device(s) 102 may be provided in the environment. For example, a series of emitting devices 102 may be provided for emitting the signal 104 that travels from a starting location to a destination location along a predetermined path.

In other example embodiments, the response action 108 that is initiated may relate to a safety objective such as pedestrian safety. For example, the emitting device 102 may be a mobile phone of a pedestrian. The mobile phone may emit the human imperceptible signal 104 to autonomous and human-driven vehicles, thereby augmenting the pedestrian's safety. A receiving device 106 coupled to a vehicle may detect the human imperceptible signal 104 and initiate a response action 108 which may be, for example, automatic braking or other collision avoidance measures or an alarm signal warning a driver of the pedestrian obstruction.

In certain example embodiments, the emitting device 102 and/or the receiving device 104 may store user profile data. The user profile data may include user preferences, user settings, or the like. The type of human imperceptible signal 104 that is generated (e.g., invisible, inaudible, haptic, etc.) may be determined based at least in part on the user profile data. In addition, other aspects of the human imperceptible signal 104 may be determined based on the user profile data. For example, if the user profile data indicates that a user operates a vehicle of a certain size, a route path generated by human imperceptible signals 104 may direct the user to a parking location capable of accommodating a vehicle of that size. It should be appreciated that above examples are merely illustrative and not exhaustive.

Example embodiments of the disclosure provide various technical features, technical effects, and/or improvements to technology. For instance, example embodiments of the disclosure provide the technical effect of improving the performance of autonomous systems. This technical effect is achieved at least in part by utilizing human imperceptible signals to enable machine-to-machine communication. The human imperceptible signals provide the technical feature of providing autonomous systems with additional information that these systems can utilize to improve the accuracy/precision of their performance. The technical feature of utilizing human imperceptible signals to enable improved autonomous system performance also serves to minimize the impact of human error.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
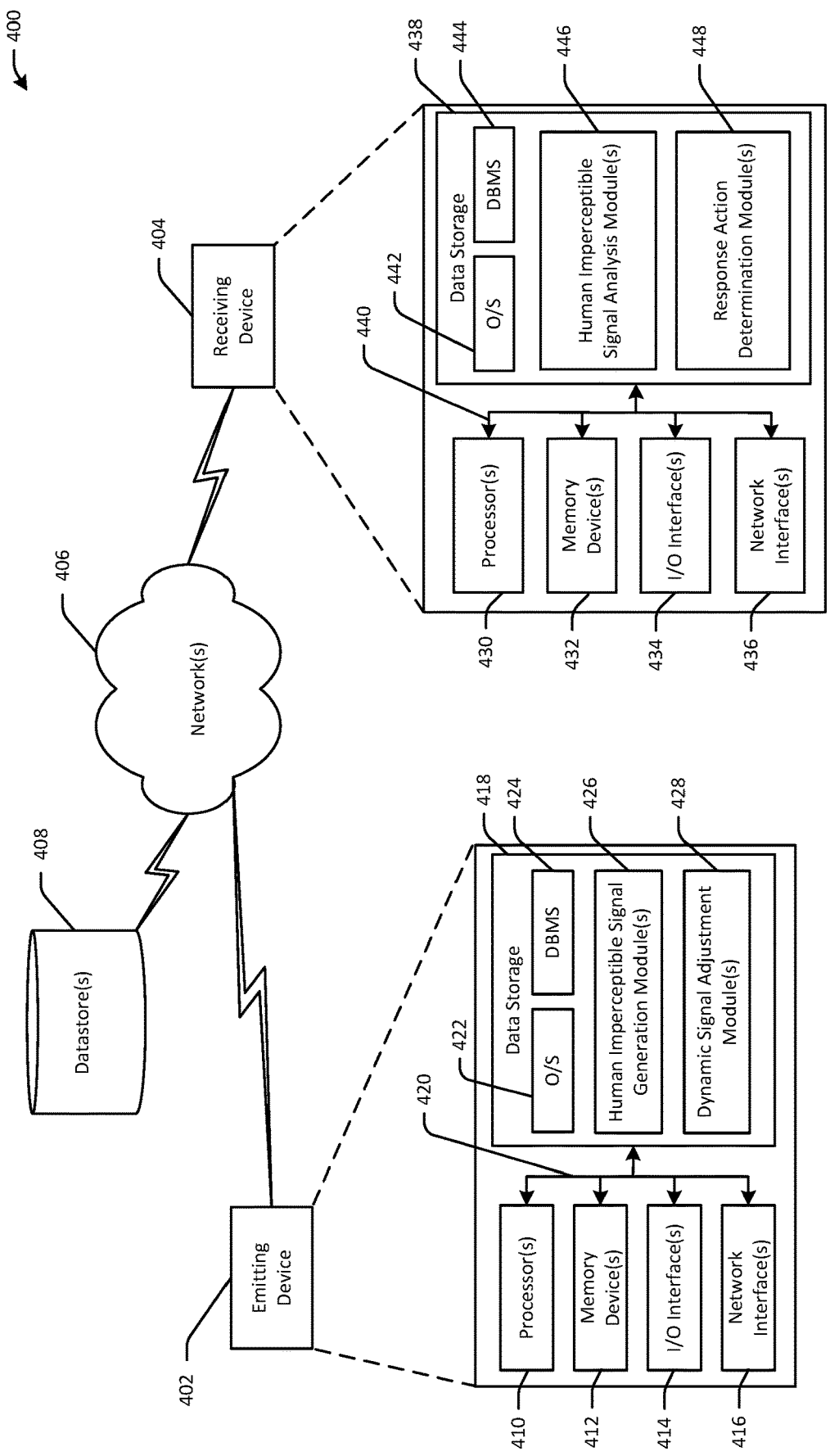
FIG. 4 is a schematic diagram of an illustrative networked architecture in accordance with one or more example embodiments of the disclosure.

FIG. 4 is a schematic diagram of an illustrative networked architecture 400 configured to implement one or more example embodiments of the disclosure. The illustrative architecture 400 may include an emitting device 402 (which may represent an example configuration of the emitting device 102) and a receiving device 404 (which may represent an example configuration of the receiving device 104). The emitting device 402 and the receiving device 404 may be configured to communicate over one or more networks 406. In certain example embodiments, multiple emitting devices 402 may be provided in a fixed or mobile state within an environment.

The network(s) 406 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 406 may have any suitable communication range associated therewith and may include, for example, global networks (e.g., the Internet), metropolitan area networks (MANs), wide area networks (WANs), local area networks (LANs), or personal area networks (PANs). In addition, the network(s) 406 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the emitting device 402 may include one or more processors (processor(s)) 410, one or more memory devices 412 (generically referred to herein as memory 412), one or more input/output ("I/O") interface(s) 414, one or more network interfaces 416, and data storage 418. The emitting device 402 may further include one or more buses 420 that functionally couple various components of the emitting device 402.

The bus(es) 420 may include at least one of a system bus, a memory bus, an address bus, or a message bus, and may permit the exchange of information (e.g., data (including computer-executable code), signaling, etc.) between various components of the emitting device 402. The bus(es) 420 may include, without limitation, a memory bus or a memory controller, a peripheral bus, an accelerated graphics port, and so forth. The bus(es) 420 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 412 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 412 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 412 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 418 may include removable storage and/or non-removable storage including, but not limited to, magnetic storage, optical disk storage, and/or tape storage. The data storage 418 may provide non-volatile storage of computer-executable instructions and other data. The memory 412 and the data storage 418, removable and/or non-removable, are examples of computer-readable storage media (CRSM) as that term is used herein.

The data storage 418 may store computer-executable code, instructions, or the like that may be loadable into the memory 412 and executable by the processor(s) 410 to cause the processor(s) 410 to perform or initiate various operations. The data storage 418 may additionally store data that may be copied to memory 412 for use by the processor(s) 410 during the execution of the computer-executable instructions. Moreover, output data generated as a result of execution of the computer-executable instructions by the processor(s) 410 may be stored initially in memory 412 and may ultimately be copied to data storage 418 for non-volatile storage.

More specifically, the data storage 418 may store one or more operating systems (O/S) 422; one or more database management systems (DBMS) 424 configured to access the memory 412 and/or one or more external data store(s) 408; and one or more program modules, applications, engines, computer-executable code, scripts, or the like such as, for example, one or more human imperceptible signal generation modules 426 and one or more dynamic signal adjustment modules 428. Any of the components depicted as being stored in data storage 418 may include any combination of software, firmware, and/or hardware. The software and/or firmware may include computer-executable instructions (e.g., computer-executable program code) that may be loaded into the memory 412 for execution by one or more of the processor(s) 410 to perform any of the operations described earlier in connection with similarly named program modules.

Although not depicted in FIG. 4, the data storage 418 may further store various types of data utilized by components of the emitting device 402 (e.g., human imperceptible signal data, user profile data, etc.). Any data stored in the data storage 418 may be loaded into the memory 412 for use by the processor(s) 410 in executing computer-executable instructions. In addition, any data stored in the data storage 418 may potentially be stored in the external data store(s) 408 and may be accessed via the DBMS 424 and loaded in the memory 412 for use by the processor(s) 410 in executing computer-executable instructions.

The processor(s) 410 may be configured to access the memory 412 and execute computer-executable instructions loaded therein. For example, the processor(s) 410 may be configured to execute computer-executable instructions of the various program modules, applications, engines, or the like of the emitting device 402 to cause or facilitate various operations to be performed in accordance with one or more embodiments of the disclosure. The processor(s) 410 may include any suitable processing unit capable of accepting data as input, processing the input data in accordance with stored computer-executable instructions, and generating output data. The processor(s) 410 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 410 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 410 may be capable of supporting any of a variety of instruction sets.

Referring now to other illustrative components depicted as being stored in the data storage 418, the O/S 422 may be loaded from the data storage 418 into the memory 412 and may provide an interface between other application software executing on the emitting device 402 and hardware resources of the emitting device 402. More specifically, the O/S 422 may include a set of computer-executable instructions for managing hardware resources of the emitting device 402 and for providing common services to other application programs. In certain example embodiments, the O/S 422 may include or otherwise control execution of one or more of the program modules depicted as being stored in the data storage 418. The O/S 422 may include any operating system now known or which may be developed in the future including, but not limited to, any server operating system, any mainframe operating system, or any other proprietary or non-proprietary operating system.

The DBMS 424 may be loaded into the memory 412 and may support functionality for accessing, retrieving, storing, and/or manipulating data stored in the memory 412, data stored in the data storage 418, and/or data stored in the external data store(s) 408. The DBMS 424 may use any of a variety of database models (e.g., relational model, object model, etc.) and may support any of a variety of query languages. The DBMS 424 may access data represented in one or more data schemas and stored in any suitable data repository. The external data store(s) 408 that may be accessible by the emitting device 402 via the DBMS 424 may include, but are not limited to, databases (e.g., relational, object-oriented, etc.), file systems, flat files, distributed datastores in which data is stored on more than one node of a computer network, peer-to-peer network datastores, or the like. In certain example embodiments, the DBMS 424 may be a lightweight DBMS designed for a mobile device.

Referring now to other illustrative components of the emitting device 402, the input/output (I/O) interface(s) 414 may facilitate the receipt of input information by the emitting device 402 from one or more I/O devices as well as the output of information from the emitting device 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the emitting device 402 or may be separate. The I/O devices may further include, for example, any number of peripheral devices such as data storage devices, printing devices, and so forth.

The I/O interface(s) 414 may also include an interface for an external peripheral device connection such as universal serial bus (USB), FireWire, Thunderbolt, Ethernet port or other connection protocol that may connect to one or more networks. The I/O interface(s) 414 may also include a connection to one or more antennas to connect to one or more of the network(s) 406 via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The emitting device 402 may further include one or more network interfaces 416 via which the emitting device 402 may communicate with any of a variety of other systems, platforms, networks, devices, and so forth. The network interface(s) 416 may enable communication, for example, with the receiving device 404 (and any number of additional receiving devices) via the network(s) 408.

In an illustrative configuration, the receiving device 404 may include one or more processors (processor(s)) 430, one or more memory devices 432 (generically referred to herein as memory 432), one or more input/output ("I/O") interface(s) 434, one or more network interfaces 436, and data storage 438. The receiving device 404 may further include one or more buses 440 that functionally couple various components of the receiving device 404.

The processor(s) 430, the memory 432, the I/O interface(s) 434, and the network interface(s) 436 may include any of the types of components and functionality described earlier in reference to the processor(s) 410, memory 412, I/O interface(s) 414, and network interface(s) 416 of the emitting device 402, respectively. The data storage 438 may store one or more operating systems (O/S) 442; one or more database management systems (DBMS) 444 configured to access the memory 432 and/or the external data store(s) 406; and one or more program modules, applications, engines, computer-executable code, scripts, or the like such as, for example, one or more human imperceptible signal analysis modules 446 and one or more response action determination modules 448. The O/S 442 and the DBMS 444 may include any of the types of components and functionality described earlier in reference to the O/S 422 and the DBMS 424. In certain example embodiments, the DBMS 444 may be a lightweight DBMS designed for a mobile device. Any of the components depicted as being stored in data storage 438 may include any combination of software, firmware, and/or hardware. The software and/or firmware may include computer-executable instructions (e.g., computer-executable program code) that may be loaded into the memory 432 for execution by one or more of the processor(s) 430 to perform any of the operations described earlier in connection with similar named applications or program modules.

It should be appreciated that the program modules depicted in FIG. 4 as being stored in the data storage 418 or the data storage 438 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the emitting device 402, hosted locally on the receiving device 404, and/or hosted on other computing device(s) accessible via the network(s) 408, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of servers in the emitting device 402 in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the emitting device 402 and/or the receiving device 404 may include alternate and/or additional hardware, software, or firmware components beyond those described or depicted without departing from the scope of the disclosure. More particularly, it should be appreciated that software, firmware, or hardware components depicted as forming part of the emitting device 402 or the receiving device 404 are merely illustrative and that some components may not be present or additional components may be provided in various embodiments. While various illustrative modules have been depicted and described as software modules stored in data storage 418 or software modules stored in data storage 438, it should be appreciated that functionality described as being supported by such modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of either of the methods 200 or 300 may be performed by a emitting device 402 having the illustrative configuration depicted in FIG. 4 and/or by a receiving device 404 having the illustrative configuration depicted in FIG. 4, or more specifically, by one or more program modules, engines, applications, or the like executing on such a system or device. It should be appreciated, however, that such operations may be implemented in connection with numerous other device configurations.

The operations described and depicted in the illustrative methods of FIGS. 2-3 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for utilizing a human imperceptible signal, the method comprising:
    detecting the human imperceptible signal, wherein the human imperceptible signal includes a hologram and a position of the hologram is dynamically modified based at least in part on a change to at least one characteristic in an environment into which the imperceptible signal is emitted, the at least one characteristic comprising a location of an object in the environment;

analyzing the human imperceptible signal to obtain digital information contained in the human imperceptible signal; and initiating a response action based at least in part on the digital information.

2. The computer-implemented method of claim 1, wherein the digital information is route guidance information specifying a path between a starting location and a destination location, and wherein initiating the response action comprises controlling navigation of an autonomous vehicle along the path.

3. The computer-implemented method of claim 1, wherein the digital information comprises an indication of a boundary of a parking location, and wherein initiating the response action comprises providing the indication of the boundary of the parking location as input to an autonomous vehicle parking protocol.

4. The computer-implemented method of claim 1, wherein detecting the human imperceptible signal comprises receiving the human imperceptible signal from a mobile device.

5. The computer-implemented method of claim 1, wherein the human imperceptible signal further includes at least one of an inaudible signal or a haptic signal.

6. A system for utilizing a human imperceptible signal, the system comprising:
at least one memory storing computer-executable instructions; and
at least one processor configured to access the at least one memory and execute the computer-executable instructions to:
detect the human imperceptible signal, wherein the human imperceptible signal includes a hologram and a position of the hologram is dynamically modified based at least in part on a change to at least one characteristic in an environment into which the imperceptible signal is emitted, the at least one characteristic comprising a location of an object in the environment;
analyze the human imperceptible signal to obtain digital information contained in the human imperceptible signal; and
initiate a response action based at least in part on the digital information.

7. The system of claim 6, wherein the digital information is route guidance information specifying a path between a starting location and a destination location, and wherein the at least one processor is configured to initiate the response action by executing the computer-executable instructions to control navigation of an autonomous vehicle along the path.

8. The system of claim 6, wherein the digital information comprises an indication of a boundary of a parking location, and wherein the at least one processor is configured to initiate the response action by executing the computer-executable instructions to provide the indication of the boundary of the parking location as input to an autonomous vehicle parking protocol.

9. The system of claim 6, wherein the at least one processor is configured to detect the human imperceptible signal by executing the computer-executable instructions to receive the human imperceptible signal from a mobile device.

10. The system of claim 6, wherein the human imperceptible signal further includes at least one of an inaudible signal or a haptic signal.

11. A computer program product for utilizing a human imperceptible signal, the computer program product comprising a non-transitory storage medium readable by a processing circuit, the storage medium storing instructions executable by the processing circuit to cause a method to be performed, the method comprising:
detecting the human imperceptible signal, wherein the human imperceptible signal includes a hologram and a position of the hologram is dynamically modified based at least in part on a change to at least one characteristic in an environment into which the imperceptible signal is emitted, the at least one characteristic comprising a location of an object in the environment;
analyzing the human imperceptible signal to obtain digital information contained in the human imperceptible signal; and
initiating a response action based at least in part on the digital information.

12. The computer program product of claim 11, wherein the digital information is route guidance information specifying a path between a starting location and a destination location, and wherein initiating the response action comprises controlling navigation of an autonomous vehicle along the path.

13. The computer program product of claim 11, wherein the digital information comprises an indication of a boundary of a parking location, and wherein initiating the response action comprises providing the indication of the boundary of the parking location as input to an autonomous vehicle parking protocol.

14. The computer program product of claim 11, wherein detecting the human imperceptible signal comprises receiving the human imperceptible signal from a mobile device.

* * * * *